United States Patent Office.

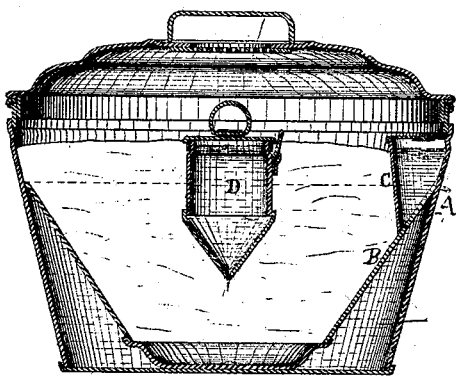
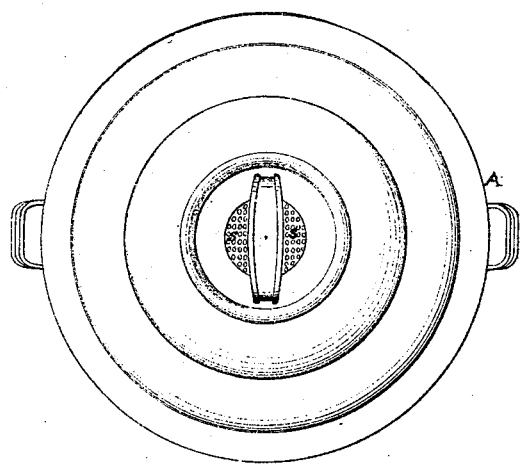

WILLIAM A. DAGGETT, OF SOUTH VINELAND, NEW JERSEY.

Letters Patent No. 109,497, dated November 22, 1870.

IMPROVEMENT IN BREAD-PANS.

The Schedule referred to in these Letters Patent and making part of the same.

*To all whom it may concern:*

Be it known that I, WILLIAM A. DAGGETT, of South Vineland, in the county of Cumberland and State of New Jersey, have invented certain new and useful Improvements in Bread-Pans; and I do hereby declare that the following is a full, clear, and exact description thereof, reference being had to the accompanying drawing and to the letters of reference marked thereon, which form a part of this specification, in which—

Figure 1 represents a central vertical section of my dough-raising pan.

Figure 2 is a plan view of the top of said pan.

The nature of my invention consists in the construction of a pan for raising dough, in the manner set forth.

A represents a pan or vessel, made of the required size, and of any suitable material. At a distance of an inch, more or less, from the top, the pan A is made to flare inward at a slight angle down to the bottom.

B designates a second pan, which is inserted in A, and extends from about midway of A to within an inch, more or less, of the bottom of A. The top of pan B will be made to fit tight in A, and soldered in position, and its sides will flare inward at a greater angle than the sides of A, so as to afford a space between the two pans, to contain hot water.

In order to introduce the hot water into the space between the two pans A and B, the semicircular funnel C is provided. The said funnel communicates, at its lower end, with the opening between A and B. The funnel C is furnished with a hinged top, which can be closed after the hot water is introduced.

As an additional device for warming the dough in pan A, the cylindrical vessel D is provided. The vessel D is formed, at its lower end, in the shape of an inverted cone, and has a hinged top to it. When the dough is placed in pan A, the vessel D, being filled with hot water, (and its top closed, to prevent the escape of vapor,) will be thrust down in the center of the dough in pan A, and thus contribute to diffuse the heat throughout the mass.

In order to give proper ventilation to the dough when in process of rising, a number of small perforations, s, will be made in the top of A, near the center.

One great advantage of my invention is that dough can be raised in the coldest weather as well as in summer, and is all times protected from dust and dirt.

Having thus described my invention,

What I claim, and desire to secure by Letters Patent, is—

1. The within-described bread-raiser, consisting of an exterior pan, A, and an interior pan, B, the latter extending from the bottom to about one-half of the distance to the top of the former, leaving a suitable space between them, and provided with the interior funnel C, all arranged as set forth.

2. In combination with the bread-raiser, the vessel D, constructed and used as and for the purpose specified.

In testimony that I claim the foregoing as my own, I affix my signature in presence of two witnesses.

WILLIAM A. DAGGETT.

Witnesses:
WM. H. GILL, Jr.,
R. C. SYKES.